United States Patent Office 3,325,489
Patented June 13, 1967

3,325,489
SUBSTITUTED 3-HYDROXYDIBENZOPYRANS
James W. Bolger, Canoga Park, Calif., assignor to Rexall Drug and Chemical Company, Los Angeles, Calif., a corporation of Delaware
No Drawing. Filed Feb. 23, 1965, Ser. No. 434,673
14 Claims. (Cl. 260—247.2)

This invention relates to compositions of matter classified in the art of chemistry as substituted dibenzopyrans.

The invention sought to be patented, in a first product composition aspect, is described as residing in the concept of a chemical compound having a molecular structure in which the 3-hydroxy-6,6-di-lower alkyl-7,8,9,10-tetrahydro-6H-dibenzo[b,d]pyran nucleus bears at the 4-position a di-lower alkylaminomethyl radical, and the hereinafter described equivalents thereof.

The invention sought to be patented, in a second product composition aspect, is described as residing in the concept of a chemical compound having a molecular structure in which the 3-hydroxy-6-oxo-7,8,9,10-tetrahydro-6H-dibenzo[b,d]pyran nucleus bears at the 4-position a di-lower alkylaminomethyl radical, and the hereinafter described equivalents thereof.

As used throughout the specification and in the claims, the term "lower alkyl" embraces both straight and branched chain alkyl radicals containing from 1 to 6 carbon atoms, for example methyl, ethyl, n-propyl, isopropyl, tert-butyl, n-amyl, n-hexyl, 2-ethylbutyl and the like.

The tangible embodiments of this invention, both as free base and in the form of their acid-addition salts, possess the inherent general physical properties of being solid crystalline materials. Elemental analysis, as well as ultra-violet and infra-red spectral data and nuclear magnetic resonance (NMR) data, taken together with the aforementioned physical properties, nature of the starting material and mode of synthesis, positively confirm the structure of the compounds sought to be patented.

The tangible embodiments of this invention also possess the inherent applied use characteristics of having significant pharmocological activity without adverse toxicity as anti-reserpine and central nervous system depressant agents and in addition as anticonvulsant, analgesic, antipyretic and anti-inflammatory agents as determined by recognized and accepted pharmacological test procedures.

The manner and process of making and using the invention will now be generally described so as to enable one skilled in the art of chemistry to make and use the same as follows:

The preparation of the tangible embodiments of this invention is illustrated by the following reaction sequence:

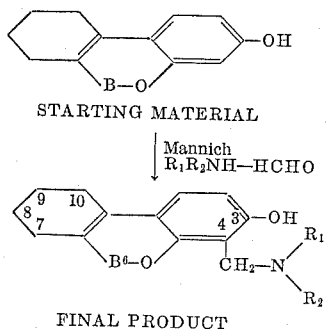

wherein B is

(second product composition aspect) or —C-(di-lower alkyl)— (first product composition aspect) and $NR_1R_2$ is di-lower alkylamino or its hereinafter described equivalents.

In accordance with the above reaction sequence a 6-oxo or 6-di lower alkyl-3-hydroxy-7,8,9,10-tetrahydro-6H-dibenzo[b,d]pyran is subjected to the well-known Mannich reaction, thereby to produce the 6-oxo- or 6-di lower alkyl-4-di-lower alkylaminomethyl-3-hydroxy-7,8,9,10-tetrahydro-6H-dibenzo[b,d]pyrans which comprise the tangible embodiments of this invention. The reaction is carried out by treating the starting material with an appropriate di-lower alkylamine, for example dimethylamine, diethylamine and the like in the presence of a source of formaldehyde, for example paraformaldehyde, in an inert organic solvent, for example ethanol, tetrahydrofuran and the like, at a temperature of up to the reflux temperature of the solvent. The product is recovered from the reaction mixture by conventional techniques of extraction, crystallization, and the like.

The starting materials for the preparation of the tangible embodiments of this invention are known compounds. The starting materials for the preparation of the 6-oxo-substituted products and a method for their synthesis are described by Adams and Baker (J. Am. Chem. Soc. 62:2405 (1940)) and the starting materials for the preparaiton of the 6-di-lower alkyl-substituted products and a method for their synthesis are described by Todd et al. (J. Chem. Soc. 1940: 1121).

In carrying out the reaction, a mono-lower alkylamine such as methylamine, ethylamine, isopropylamine and the like, a phenyl-lower alkylamine such as benzylamine, phenethylamine and the like, or a saturated cyclic organic base of the formula HNRR wherein each R is lower alkyl linked through a methylene bridge or a hetero-oxygen, nitrogen or sulfur atom and lower alkyl substituted derivatives thereof, such as piperidine, pyrrolidine, piperazine, morpholine, 2-methylmorpholine, 3-ethylpyrrolidine, N-methyl piperazine and the like are the full equivalents of a di-lower alkylamine yielding final products bearing $NR_1R_2$ substitution corresponding to the reactant used which have the same utility as the final products prepared utilizing a di-lower alkylamine. In addition, lower aliphatic aldehydes of the formula RCHO wherein R is lower alkyl may be employed, such as acetaldehyde, propionaldehyde, butyraldehyde and the like, thereby to prepare final products wherein the methylene bridge linking the $NR_1R_2$ radical with the 4-position of the nucleus bears a lower alkyl substituent which are the full equivalents to the final products bearing an unsubstituted methylene bridge.

Starting materials bearing one or more lower alkyl substituents at the 7,8,9 or 10-posiiton are prepared by the same techniques described in the Adams et al. and Todd et al. papers referred to hereinabove, such lower alkyl substituted starting materials being the full equivalents of the specific starting materials depicted in the hereinabove described reaction with a Mannich base, thereby resulting in final products bearing the same lower alkyl substitution at the 7,8,9 or 10 position as in the starting material. Such products have the same utility as the specific products depicted in the above reaction sequence and are included within the scope of the tangible embodiments of this invention.

The tangible embodiments of this invention, in free base form, may, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventor for carrying out this invention will now be set forth as follows:

The following examples illustrate the preparation of tangible embodiments of this invention in its first product composition aspect.

EXAMPLE 1

*4-dimethylaminomethyl-6,6-dimethyl-3-hydroxy-7,8,9,10-tetrahydrodibenzo[b,d]pyran hydrochloride*

To 3 - hydroxy-6,6-dimethyl-7,8,9,10-tetrahydro-6H-dibenzo[b,d]pyran (26.5 g., 0.115 mole) is added absolute ethanol (350 ml.), paraformaldehyde (3.45 g., 0.115 mole) and 37% aqueous dimethylamine (14.0 g., 0.115 mole). The mixture is shaken for about 72 hours, allowed to stand at room temperature for one week and then refluxed for seven hours. The product is obtained by conventional techniques of concentration, recrystallization, etc. as the hydrochloride salt, M.P. 199°–202° C., in a yield of 21.0 g.

*Analysis.*—Calculated for $C_{18}H_{26}NO_2Cl$: C, 66.75%; H, 8.10%; N, 4.32%; Cl, 10.95%. Found: C, 66.90%; H, 7.93%; N, 4.51%; Cl, 10.73%.

EXAMPLE 2

*4-diethylaminomethyl-6,6-dimethyl-3-hydroxy-7,8,9,10-tetrahydro-6H-dibenzo[b,d]pyran hydrochloride*

In the same manner as described in Example 1, 3-hydroxy - 6,6-dimethyl-7,8,9,10-tetrahydro-6H-dibenzo[b,d]pyran (26.5 g., 0.115 mole) is treated with diethylamine (8.5 g., 0.115 mole) and paraformaldehyde (3.45 g., 0.115 mole) to yield 14.4 g. of the product as a white crystalline solid and in the form of its hydrochloride salt, M.P. 197°–199° C.

*Analysis.*—Calculated for $C_{20}H_{30}NO_2Cl$: C, 68.25%; H, 8.60%; N, 3.98%; Cl, 10.07%. Found: C, 68.17%; H, 8.51%; N, 4.01%; Cl, 9.97%.

EXAMPLE 3

*4-pyrrolidinomethyl-6,6-dimethyl-3-hydroxy-7,8,9,10-tetrahydro-6H-dibenzo[b,d]pyran hydrochloride*

In the same manner as described in Example 1, 3-hydroxy - 6,6-dimethyl-7,8,9,10-tetrahydro-6H-dibenzo[b,d]pyran (26.5 g., 0.115 mole) is treated with pyrrolidine (8.2 g., 0.115 mole) and paraformaldehyde (3.45 g., 0.115 mole) to yield 19.2 g. of white product in the form of its hydrochloride salt, M.P. 206°–208° C.

*Analysis.*—Calculated for $C_{20}H_{28}NO_2Cl$: C, 6.65%; H, 8.07%; N, 4.00%; Cl, 10.14%. Found: C, 68.40%; H, 8.38%; N, 4.34%; Cl, 10.02%.

EXAMPLE 4

*4-piperidinomethyl-6,6-dimethyl-3-hydroxy-7,8,9,10-tetrahydro-6H-dibenzo[b,d]pyran hydrochloride*

In the same manner as described in Example 1, 3-hydroxy - 6,6-dimethyl-7,8,9,10-tetrahydro-6H-dibenzo[b,d]pyran (26.5 g., 0.115 mole) is treated with piperidine (9.8 g., 0.115 mole) and paraformaldehyde (3.45 g., 0.115 mole) to yield 14.6 g. of product in the form of its hydrochloride salt, M.P. 203°–205° C.

*Analysis.*—Calculated for $C_{21}H_{30}NO_2Cl$: C, 69.31%; H, 8.31%; N, 3.85%; Cl, 9.74%. Found: C, 69.17%; H, 8.26%; N, 4.09%; Cl, 9.45%.

EXAMPLE 5

*4-morpholinomethyl-6,6-dimethyl-3-hydroxy-7,8,9,10-tetrahydro-6H-dibenzo[b,d]pyran*

In the same manner as described in Example 1, 3-hydroxy - 6,6-dimethyl-7,8,9,10-tetrahydro-6H-dibenzo[b,d]pyran (26.5 g., 0.115 mole) is treated with morpholine (10.0 g., 0.115 mole) and paraformaldehyde (3.45 g., 0.115 mole) to yield 28.8 g. of product as the free base, M.P. 139°–141° C.

*Analysis.*—Calculated for $C_{20}H_{27}NO_3$: C, 72.92%; H, 8.26%; N, 4.25%. Found: C, 72.71%; H, 8.07%; N, 4.46%.

EXAMPLE 6

*4-(N-methylpiperazino)methyl-6,6-dimethyl-3 - hydroxy-7,8,9,10-tetrahydro - 6H - dibenzo[b,d]pyran dihydrochloride*

In the same manner as described in Example 1, 3 - hydroxy-6,6-dimethyl-7,8,9,10-tetrahydro-6H-dibenzo[b,d]pyran (26.5 g., 0.115 mole) is treated with N-methylpiperazine (11.6 g., 0.115 mole) and paraformaldehyde (3.45 g., 0.115 mole) to yield 13.1 g. of white powdery product in the form of its dihydrochloride salt, M.P. 308°–310° C.

*Analysis.*—Calculated for $C_{21}H_{32}N_2O_2Cl_2$: C, 60.68%; H, 7.77%; N, 6.75%; Cl, 17.08%. Found: C, 60.50%; H, 7.80%; N, 7.01%; Cl, 16.70%.

The following examples illustrate the preparation of tangible embodiments of this invention in its second product composition aspect.

EXAMPLE 7

*4-dimethylaminomethyl-3-hydroxy-6-oxo-7,8,9,10-tetrahydro-6H-dibenzo[b,d]pyran hydrochloride*

To a slurry of 3-hydroxy-6-oxo-7,8,9,10-tetrahydro-6H-dibenzo[b,d]pyran (15.2 g., 0.07 mole) in absolute ethanol (75 ml.) is added a mixture of paraformaldehyde (2.1 g., 0.07 mole) and 35% aqueous dimethylamine (9.0 g., 0.07 mole) in absolute ethanol (75 ml.). The combined mixture is heated in a sealed container for 15 hours at 75° C. and then concentrated in vacuo to yield a residue that is dissolved in chloroform. The chloroform solution is twice washed with 5% sodium hydroxide (25 ml. portions), dried over magnesium sulfate and acidified with hydrogen chloride gas. Upon concentration 6.1 g. of a yellow solid is obtained which is recrystallized from methanol-isopropanol, M.P. 254°–256° C.

*Analysis.*—Calculated for $C_{16}H_{20}NO_3Cl$: C, 62.03%; H, 6.50%; N, 4.52%; Cl, 11.45%. Found: C, 61.61%; H, 6.22%; N, 4.75%; Cl, 11.55%.

EXAMPLE 8

*4-diethylaminomethyl-3-hydroxy-6-oxo-7,8,9,10-tetrahydro-6H-dibenzo[b,d]pyran hydrochloride*

3-hydroxy-6-oxo-7,8,9,10-tetrahydro-6H-dibenzo - [b,d] pyran (25 g., 0.115 mole) is treated with paraformaldehyde (3.45 g., 0.115 mole) and diethylamine (8.5 g., 0.115 mole) by shaking in absolute ethanol (400 ml.) for 70 hours at room temperature followed by gentle reflux for 4 hours. The solution is concentrated to an oil that is dissolved in ether and treated with hydrogen chloride gas to yield the solid hydrochloride salt, 8.6 g., M.P. 218°–220° C. Recrystallization is from methanol-isopropanol.

*Analysis.*—Calculated for $C_{18}H_{24}NO_3Cl$: C, 63.99%; H, 7.17%; N, 4.15%; Cl, 10.49%. Found: C, 63.99%; H, 7.39%; N, 4.07%; Cl, 9.94%.

EXAMPLE 9

*4-pyrrolidinomethyl-3-hydroxy-6-oxo-7,8,9,10-tetrahydro-6H-dibenzo[b,d]pyran hydrochloride*

In the same manner as described in Example 8, 3-hydroxy-7,8,9,10-tetrahydro-6-oxo-6H - dibzeno[b,d]pyran (25 g., 0.115 mole) is treated with paraformaldehyde (3.45 g., 0.115 mole) and pyrrolidine (8.2 g., 0.115 mole) to yield 33 g. of the product in the form of its hydrochloride salt, M.P. 266°–268° C.

*Analysis.*—Calculated for $C_{18}H_{22}NO_3Cl \cdot \frac{1}{4}H_2O$: C, 63.52%; H, 6.70%; N, 4.12%; Cl, 10.41%. Found: C, 63.51%; H, 6.44%; N, 4.27%; Cl, 10.22%.

EXAMPLE 10

*4-piperidinomethyl-3-hydroxy-6-oxo-7,8,9,10-tetrahydro-6H-dibenzo[b,d]pyran*

In the same manner as described in Example 8, 3-hydroxy-7,8,9,10-tetrahydro-6H-dibenzo[b,d]pyran-6 - one (25 g., 0.115 mole) is treated with paraformaldehyde (3.45 g., 0.115 mole) and piperidine (26.8 g., 0.115 mole) to yield 23.5 g. of the free base, M.P. 166°–168° C.

*Analysis.*—Calculated for $C_{19}H_{23}NO_3$: C, 72.82%; H, 7.40%; N, 4.47%. Found: C, 72.71%; H, 7.39%; N, 4.76%.

EXAMPLE 11

*4-morpholinomethyl-3-hydroxy-6-oxo-7,8,9,10-tetrahydro-6H-dibenzo[b,d]pyran*

In the same manner as described in Example 8, 3 - hydroxy - 6 - oxo - 7,8,9,10 - tetrahydro - 6H - dibenzo[b,d]pyran (25 g., 0.115 mole) is treated with paraformaldehyde (3.45 g., 0.115 mole) and morpholine (10 g., 0.115 mole) and morpholine (10 g., 0.115 mole) to yield 24 g. of the free base, M.P. 185°–187° C.

*Analysis.*—Calculated for $C_{18}H_{21}NO_3$: C, 68.55%; H, 6.71%; N, 4.44%. Found: C, 68.73%; H, 6.67%; N, 4.39%.

EXAMPLE 12

*4-(N-methylpiperazino)methyl-3-hydroxy-6-oxo-7,8,9,10-tetrahydro-6H-dibenzo[b,d]pyran*

In the same manner as described in Example 8, 3 - hydroxy - 6 - oxo - 7,8,9,10 - tetrahydro - 6H - dibenzo[b,d]pyran - 6 - one (25 g., 0.115 mole) is treated with paraformaldehyde (3.45 g., 0.115 mole) and N-methylpiperazine (11.6 g., 0.115 mole) to yield 19.7 g. of the free base, M.P. 144°–146° C.

*Analysis.*—Calculated for $C_{19}H_{24}N_2O_3$: C, 69.49%; H, 7.37%; N, 8.53%. Found: C, 69.60%; H, 7.30%; N, 7.99%.

The subject matter which the applicant regards as his invention is particularly pointed out and distinctly claimed as follows.

I claim:
1. 4 - di - lower alkylaminomethyl - 6,6 - di - lower alkyl - 3 - hydroxy - 7,8,9,10 - tetrahydro - 6H - dibenzo[b,d]pyran.
2. 4 - dimethylaminomethyl - 6,6 - dimethyl - 3 - hydroxy-7,8,9,10-tetrahydro-6H-dibenzo[b,d]pyran.
3. 4 - diethylaminomethyl - 6,6 - dimethyl - 3 - hydroxy-7,8,9,10-tetrahydro-6H-dibenzo[b,d]pyran.
4. 4 - pyrrolidinomethyl - 6,6 - dimethyl - 3 - hydroxy-7,8,9,10-tetrahydro-6H-dibenzo[b,d]pyran.
5. 4 - piperidinomethyl - 6,6 - dimethyl - 3 - hydroxy-7,8,9,10 - tetrahydro - 6H - dibenzo[b,d]pyran.
6. 4 - morpholinomethyl - 6,6 - dimethyl - 3 - hydroxy-7,8,9,10-tetrahydro-6H-dibenzo[b,d]pyran.
7. 4 - (N - methylpiperazino)methyl - 6,6 - dimethyl-3 - hydroxy - 7,8,9,10 - tetrahydro - 6H - dibenzo[b,d]pyran.
8. 4 - di - lower alkylaminomethyl - 3 - hydroxy - 6-oxo - 7,8,9,10 - tetrahydro - 6H - dibenzo[b,d]pyran.
9. 4 - dimethylaminomethyl - 3 - hydroxy - 6 - oxo-7,8,9,10 - tetrahydro - 6H - dibenzo[b,d]pyran.
10. 4 - diethylaminomethyl - 3 - hydroxy - 6 - oxo-7,8,9,10-tetrahydro-6H-dibenzo[b,d]pyran.
11. 4 - pyrrolidinomethyl - 3 - hydroxy - 6 - oxo-7,8,9,10-tetrahydro-6H-dibenzo[b,d]pyran.
12. 4 - piperidinomethyl - 3 - hydroxy - 6 - oxo-7,8,9,10-tetrahydro-6H-dibenzo[b,d]pyran.
13. 4 - morpholinomethyl - 3 - hydroxy - 6 - oxo-7,8,9,10-tetrahydro-6H-dibenzo[b,d]pyran.
14. 4 - (N - methylpiperazino)methyl - 3 - hydroxy-6 - oxo - 7,8,9,10 - tetrahydro - 6H - dibenzo[b,d]pyran.

No references cited

ALEX MAZEL, *Primary Examiner.*

JOSE TOVAR, *Assistant Examiner.*